(12) United States Patent
Hashimoto et al.

(10) Patent No.: US 11,226,034 B2
(45) Date of Patent: Jan. 18, 2022

(54) VEHICLE CONTROL DATA GENERATING METHOD, VEHICLE CONTROLLER, VEHICLE CONTROL SYSTEM, AND VEHICLE LEARNING DEVICE

(71) Applicant: TOYOTA JIDOSHA KABUSHIKI KAISHA, Toyota (JP)

(72) Inventors: Yosuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/120,828

(22) Filed: Dec. 14, 2020

(65) Prior Publication Data
US 2021/0190204 A1 Jun. 24, 2021

(30) Foreign Application Priority Data
Dec. 20, 2019 (JP) .............................. JP2019-230016

(51) Int. Cl.
*F16H 61/02* (2006.01)
*G07C 5/08* (2006.01)
(Continued)

(52) U.S. Cl.
CPC .......... *F16H 61/0213* (2013.01); *G06N 20/00* (2019.01); *G07C 5/0841* (2013.01); *F16H 2059/663* (2013.01); *F16H 2061/0223* (2013.01); *F16H 2061/0234* (2013.01); *F16H 2708/22* (2013.01); *F16H 2710/04* (2013.01); *F16H 2710/22* (2013.01); *F16H 2710/24* (2013.01)

(58) Field of Classification Search
CPC ........... F16H 2059/663; F16H 2059/66; F16H 61/0213; F16H 2061/0234; F16H 2061/0223; F16H 2061/0225; F16H 2708/22; F16H 2710/04; F16H 2710/22; F16H 2710/24; G07C 5/0841
See application file for complete search history.

(56) References Cited

U.S. PATENT DOCUMENTS

| 5,124,916 A | * | 6/1992 | Tokoro ................ F16H 61/0213 701/57 |
| 2002/0049116 A1 | * | 4/2002 | Shiiba ................ F16H 61/0213 477/97 |

(Continued)

FOREIGN PATENT DOCUMENTS

JP 2004-257434 A 9/2004

*Primary Examiner* — Edwin A Young
(74) *Attorney, Agent, or Firm* — Oblon, McClelland, Maier & Neustadt, L.L.P.

(57) ABSTRACT

A CPU sets a gear ratio, which is an action, on the basis of an accelerator operation amount, a vehicle speed, a gradient, a curvature, and a current gear ratio, until a predetermined amount of time elapses. The CPU operates a transmission in accordance with the set gear ratio and obtains a rotation speed NE of a crankshaft at that time. When the predetermined amount of time has elapsed, the CPU updates an action value function by providing a reward in accordance with whether the number of times of switching the rotation speed NE or the gear ratio meets a standard.

13 Claims, 11 Drawing Sheets

(51) Int. Cl.
*G06N 20/00* (2019.01)
*F16H 59/66* (2006.01)

(56) References Cited

U.S. PATENT DOCUMENTS

| 2013/0184949 A1* | 7/2013 | Saito | B60W 10/11 |
| | | | 701/58 |
| 2015/0247733 A1* | 9/2015 | Horihata | G01C 21/34 |
| | | | 701/410 |

* cited by examiner

VEHICLE CONTROL DATA GENERATING METHOD, VEHICLE CONTROLLER, VEHICLE CONTROL SYSTEM, AND VEHICLE LEARNING DEVICE

BACKGROUND

1. Field

The present disclosure relates to a vehicle control data generating method, a vehicle controller, a vehicle control system, and a vehicle learning device.

2. Description of Related Art

Japanese Laid-Open Patent Publication No. 2004-257434 discloses a controller that includes a first shift schedule and a second shift schedule, which determine a gear ratio of a transmission in accordance with an accelerator operation amount and a vehicle speed. The controller selects one of the two shift schedules according to an integrated value of the absolute value of an acceleration.

Since the shift schedule is switched according to the integrated value, the gear ratio is changed more appropriately than in a case in which a shift schedule is employed that is uniquely determined according to the accelerator operation amount and the vehicle speed. However, although the gear ratio can be switched more appropriately by increasing the inputs for the control of gear ratio switching, the number of adaptation steps of the shift schedule is increased.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect, a vehicle control data generating method uses a memory device and an execution device. The method includes: storing, in the memory device, a deviation variable related to an amount of deviation of a road on which a vehicle is traveling from a reference road, and relationship-defining data that defines a relationship between a state of the vehicle and a gear ratio variable related to a gear ratio of a transmission mounted on the vehicle; and with the relationship-defining data stored in the memory device. The method causes the execution device to execute: an operation process that operates the gear ratio of the transmission; an obtaining process that obtains the state of the vehicle and the deviation variable based on a detection value of a sensor; a reward calculating process that causes, on a basis of the state of the vehicle obtained by the state obtaining process, a reward, that is provided when a characteristic of the vehicle meets a predetermined standard, to be larger than a reward that is provided when the characteristic of the vehicle does not meet the predetermined standard; and an update process that updates the relationship-defining data by inputting, to a predetermined update map, the state of the vehicle and the deviation variable obtained by the state obtaining process, and the reward corresponding to the operation of the operation process. The update map outputs the relationship-defining data that has been updated to increase an expected return of the reward of a case in which the gear ratio is operated in accordance with the relationship-defining data.

The relationship-defining data determines the gear ratio variable according to the deviation variable in addition to the state of the vehicle. As compared to data that defines only the relationship between the state of the vehicle and the gear ratio variable, the relationship-defining data designates an appropriate gear ratio variable according to the condition of the road. The above-described method calculates a reward that accompanies operation of the transmission, so as to acquire the type of the reward obtained through that operation. Then, the relationship-defining data is updated based on the reward, using the update map according to reinforcement learning. This sets the relationship of the gear ratio with the deviation variable and the state of the vehicle. Thus, the number of adaptation steps is reduced when the relationship of the gear ratio with the deviation variable and the state of the vehicle is set.

In the above-described vehicle control data generating method, the reference road is preferably a road that meets a standard, the standard being that a gradient of the road is a gradient reference value, and the deviation variable obtained by the obtaining process preferably includes a variable related to the gradient of the road.

Since the driven wheels are required to exert a larger torque when the gradient of the road is large than when the gradient of the road is small, the appropriate shift schedule may vary depending on the gradient of the road. Accordingly, the above-described method incorporates a variable related to the gradient of the road into the deviation variable. This allows the relationship-defining data that defines an appropriate relationship between the road gradient and the gear ratio to be learned through reinforcement learning.

In the above-described vehicle control data generating method, the reference road is preferably a road that meets a standard, the standard being that a curvature of the road is a curvature reference value, and the deviation variable obtained by the obtaining process preferably includes a variable related to the curvature of the road.

Since the user is more likely to switch between operation of the accelerator and operation of the brakes when driving in a curve than when driving on a straight road, the appropriate shift schedule may vary depending on the curvature of the road. Accordingly, the above-described method incorporates a variable related to the curvature of the road into the deviation variable. This allows the relationship-defining data that defines an appropriate relationship between the road curvature and the gear ratio to be learned through reinforcement learning.

In the above-described vehicle control data generating method, the state of the vehicle preferably includes a vehicle speed and a load variable related to a load on a propelling force generator that supplies force to a driven wheel via the transmission.

With the above-described method, the relationship-defining data defines the relationship of the gear ratio with the load variable and the vehicle speed. This allows the gear ratio that is appropriate for the load variable and the vehicle speed to be learned through reinforcement learning.

In the above-described vehicle control data generating method, the predetermined standard preferably includes a condition that a switching count of the gear ratio within a predetermined amount of time is less than or equal to a predetermined count. The reward calculating process preferably includes a process that provides a larger reward when the switching count is less than or equal to the predetermined count than when the switching count is larger than the predetermined count.

When the switching count of the gear ratio is excessively large, the shift schedule may be inappropriate. In this respect, the above-described method provides a larger reward when the switching count is less than or equal to the predetermined count than when the switching count is larger than the predetermined count. This allows the relationship-defining data that defines a shift schedule suppressing frequent switching of the gear ratio to be learned through reinforcement learning.

In the above-described vehicle control data generating method, the predetermined standard preferably includes a condition that a rotation speed of a propelling force generator that supplies force to a driven wheel via the transmission is higher than or equal to a lower speed limit. The reward calculating process preferably includes a process that provides a larger reward when the rotation speed of the propelling force generator is higher than or equal to the lower speed limit than when the rotation speed is lower than the lower speed limit.

When the rotation speed of the propelling force generator is excessively low, the driving force of the vehicle cannot be easily increased. In this respect, the above-described method provides a larger reward when the rotation speed is higher than or equal to the lower speed limit than when the rotation speed is lower than the lower speed limit. This allows the relationship-defining data that defines the gear ratio appropriate for achieving a required driving force of the vehicle to be learned through reinforcement learning.

In the above-described vehicle control data generating method, the vehicle preferably includes a paddle switch, and the obtaining process preferably includes a process that obtains an operation state of the paddle switch. The reward calculating process preferably includes a process that provides a smaller reward when the gear ratio is changed through operation of the paddle switch than when the paddle switch is not operated.

When the paddle switch is operated, the user may be feeling that the control of the gear ratio is inappropriate. In this respect, the above-described method provides a smaller reward when the gear ratio is changed through operation of the paddle switch than when the paddle switch is not operated. This allows the relationship-defining data that defines the gear ratio suitable for the user's driving habit to be learned through reinforcement learning.

In the above-described vehicle control data generating method, the obtaining process preferably includes a process that obtains an accelerator operation amount. The reward calculating process preferably includes a process that provides a smaller reward when downshifting is performed through operation of an accelerator than when downshifting is not performed.

The above-described method provides a smaller reward when kickdown has occurred than when kickdown is not occurring. This allows the relationship-defining data that defines the gear ratio that prevents the user from experiencing torque insufficiency to be learned through reinforcement learning.

The above-described vehicle control data generating method further includes: on a basis of the relationship-defining data that has been updated by the update process, causing the execution device to establish a correspondence of the state of the vehicle and the deviation variable with a value of the gear ratio variable that maximizes the expected return, thereby generating control map data, wherein the control map data receives the state of the vehicle and the deviation variable as inputs, and outputs the value of the gear ratio variable that maximizes the expected return.

The above-described method generates control map data on the basis of the relationship-defining data, which has been learned through reinforcement learning. Thus, by providing the controller with the control map data, the value of the gear ratio variable that maximizes the expected return is easily set on the basis of the state of the vehicle and the deviation variable.

In a second general aspect, a vehicle controller includes a memory device and an execution device. The vehicle controller stores, in the memory device, a deviation variable related to an amount of deviation of a road on which a vehicle is traveling from a reference road, and relationship-defining data that defines a relationship between a state of the vehicle and a gear ratio variable related to a gear ratio of a transmission mounted on the vehicle. With the relationship-defining data stored in the memory device, the vehicle controller causes the execution device to execute: an operation process that operates the gear ratio of the transmission; an obtaining process that obtains the state of the vehicle and the deviation variable based on a detection value of a sensor; a reward calculating process that causes, on a basis of the state of the vehicle obtained by the state obtaining process, a reward, that is provided when a characteristic of the vehicle meets a predetermined standard, to be larger than a reward that is provided when the characteristic of the vehicle does not meet the predetermined standard; and an update process that updates the relationship-defining data by inputting, to a predetermined update map, the state of the vehicle and the deviation variable obtained by the state obtaining process, and the reward corresponding to the operation of the operation process. The update map outputs the relationship-defining data that has been updated to increase an expected return of the reward of a case in which the gear ratio is operated in accordance with the relationship-defining data. The operation process includes a process that operates the transmission on a basis of the relationship-defining data and in accordance with a value of the gear ratio variable that corresponds to the state of the vehicle and the deviation variable.

With the above-described configuration, the value of the gear ratio variable is set on the basis of the relationship-defining data, which is learned through reinforcement learning. The transmission is operated on the basis of that set value. This allows the transmission to be operated to increase the expected return.

In a third general aspect, a vehicle control system includes an execution device and a memory device. The vehicle control system stores, in the memory device, a deviation variable related to an amount of deviation of a road on which a vehicle is traveling from a reference road, and relationship-defining data that defines a relationship between a state of the vehicle and a gear ratio variable related to a gear ratio of a transmission mounted on the vehicle. With the relationship-defining data stored in the memory device, the vehicle control system causes the execution device to execute: an operation process that operates the gear ratio of the transmission; an obtaining process that obtains the state of the vehicle and the deviation variable based on a detection value of a sensor; a reward calculating process that causes, on a basis of the state of the vehicle obtained by the state obtaining process, a reward, that is provided when a characteristic of the vehicle meets a predetermined standard, to be larger than a reward that is provided when the characteristic of the vehicle does not meet the predetermined standard; and an update process that updates the relationship-defining data by inputting, to a predetermined update map, the state of the vehicle and the deviation variable obtained by the state obtaining process, and the reward corresponding to the operation of the operation process. The update map outputs the relationship-defining data that has been updated to increase an expected return of the reward of a case in which the gear ratio is operated in accordance with the relationship-defining data. The operation process includes a process that operates the transmission on a basis of the relationship-defining data and in accordance with a value of the gear ratio variable that corresponds to the state of the vehicle and the deviation variable. The execution device includes a first execution device mounted on the vehicle and a second execution device that is an out-of-vehicle device. The first execution device executes at least the obtaining process and the operation process. The second execution device executes at least the update process.

The above-described configuration executes the update process using the second execution device. Thus, as compared to a case in which the update process is executed using the first execution device, the computation load on the first execution device is reduced.

The phrase "the second execution device that is an out-of-vehicle device" means that the second execution device is not an in-vehicle device.

In a fourth general aspect, a vehicle controller is employed in a vehicle control system. The vehicle control system includes an execution device and a memory device. The vehicle controller stores, in the memory device, a deviation variable related to an amount of deviation of a road on which a vehicle is traveling from a reference road, and relationship-defining data that defines a relationship between a state of the vehicle and a gear ratio variable related to a gear ratio of a transmission mounted on the vehicle. With the relationship-defining data stored in the memory device, the vehicle controller causes the execution device to execute: an operation process that operates the gear ratio of the transmission; an obtaining process that obtains the state of the vehicle and the deviation variable based on a detection value of a sensor; a reward calculating process that causes, on a basis of the state of the vehicle obtained by the state obtaining process, a reward, that is provided when a characteristic of the vehicle meets a predetermined standard, to be larger than a reward that is provided when the characteristic of the vehicle does not meet the predetermined standard; and an update process that updates the relationship-defining data by inputting, to a predetermined update map, the state of the vehicle and the deviation variable obtained by the state obtaining process, and the reward corresponding to the operation of the operation process. The update map outputs the relationship-defining data that has been updated to increase an expected return of the reward of a case in which the gear ratio is operated in accordance with the relationship-defining data. The operation process includes a process that operates the transmission on a basis of the relationship-defining data and in accordance with a value of the gear ratio variable that corresponds to the state of the vehicle and the deviation variable. The execution device includes a first execution device mounted on the vehicle and a second execution device that is an out-of-vehicle device. The first execution device executes at least the obtaining process and the operation process. The second execution device executes at least the update process. The vehicle controller includes the first execution device.

In a fifth general aspect, a vehicle controller is employed in a vehicle control system. The vehicle control system includes an execution device and a memory device. The vehicle controller stores, in the memory device, a deviation variable related to an amount of deviation of a road on which a vehicle is traveling from a reference road, and relationship-defining data that defines a relationship between a state of the vehicle and a gear ratio variable related to a gear ratio of a transmission mounted on the vehicle. With the relationship-defining data stored in the memory device, the vehicle controller causes the execution device to execute: an operation process that operates the gear ratio of the transmission; an obtaining process that obtains the state of the vehicle and the deviation variable based on a detection value of a sensor; a reward calculating process that causes, on a basis of the state of the vehicle obtained by the state obtaining process, a reward, that is provided when a characteristic of the vehicle meets a predetermined standard, to be larger than a reward that is provided when the characteristic of the vehicle does not meet the predetermined standard; and an update process that updates the relationship-defining data by inputting, to a predetermined update map, the state of the vehicle and the deviation variable obtained by the state obtaining process, and the reward corresponding to the operation of the operation process. The update map outputs the relationship-defining data that has been updated to increase an expected return of the reward of a case in which the gear ratio is operated in accordance with the relationship-defining data. The operation process includes a process that operates the transmission on a basis of the relationship-defining data and in accordance with a value of the gear ratio variable that corresponds to the state of the vehicle and the deviation variable. The execution device includes a first execution device mounted on the vehicle and a second execution device that is an out-of-vehicle device. The first execution device executes at least the obtaining process and the operation process. The second execution device executes at least the update process. The vehicle controller includes the second execution device.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A vehicle control data generating method, a vehicle controller, a vehicle control system, and a vehicle learning device according to embodiments will now be described with reference to the drawings.

First Embodiment

Figure 1:
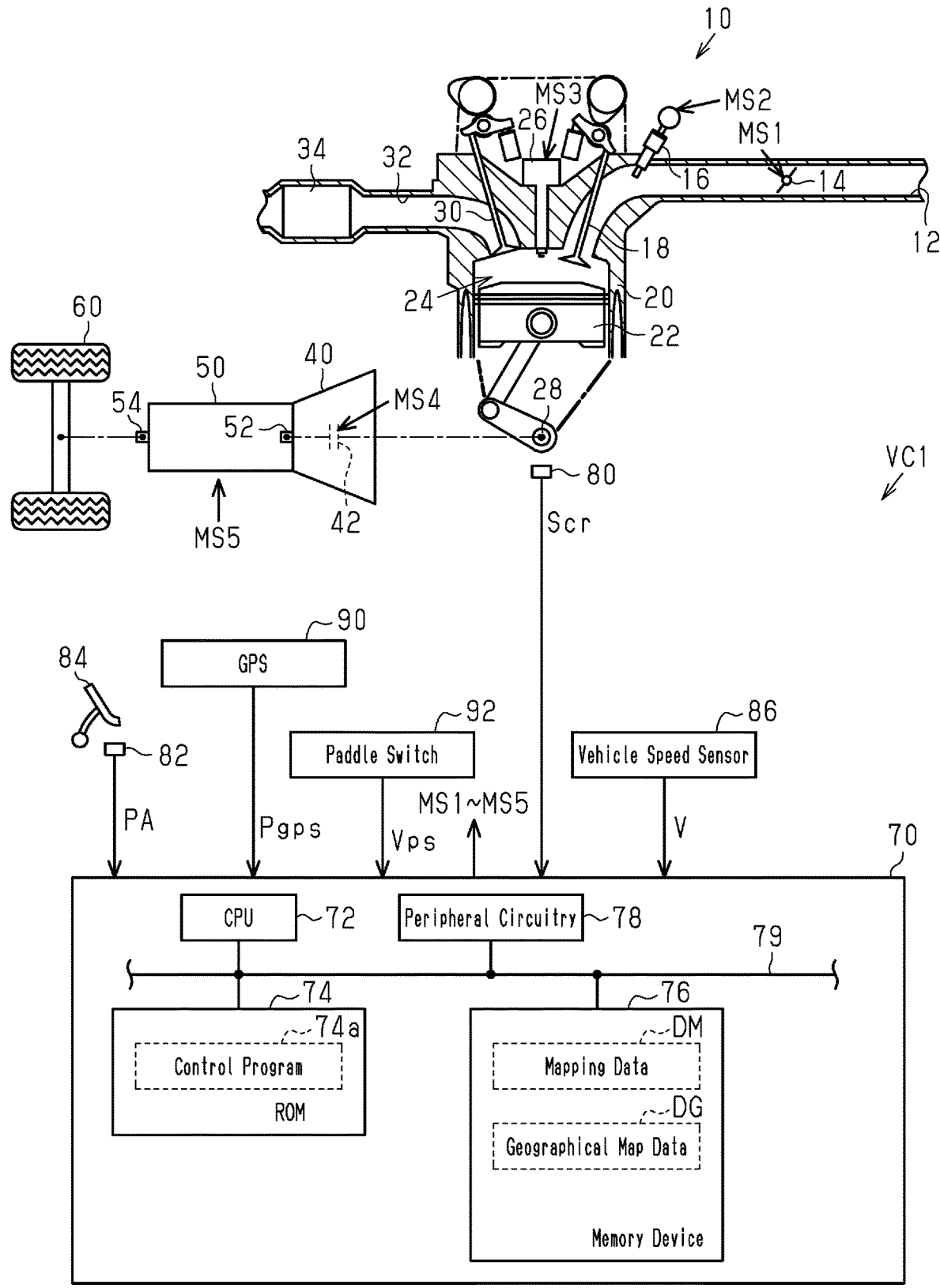
FIG. 1 is a diagram showing a controller according to a first embodiment of the present disclosure and a drive system.

FIG. 1 shows the configuration of a drive system of a vehicle VC1 and a controller according to a first embodiment.

As shown in FIG. 1, an internal combustion engine 10 includes an intake passage 12, in which a throttle valve 14 and a fuel injection valve 16 are arranged in that order from the upstream side. Air drawn into the intake passage 12 and fuel injected from the fuel injection valve 16 flow into a combustion chamber 24, which is defined by a cylinder 20 and a piston 22, when an intake valve 18 is opened. In the combustion chamber 24, air-fuel mixture is burned by spark discharge of an ignition device 26. The energy generated by the combustion is converted into rotational energy of a crankshaft 28 via the piston 22. The burned air-fuel mixture is discharged to an exhaust passage 32 as exhaust gas when an exhaust valve 30 is opened. The exhaust passage 32 incorporates a catalyst 34, which is an aftertreatment device for purifying exhaust gas.

The crankshaft 28 is configured to be mechanically coupled to an input shaft 52 of a transmission 50 via a torque converter 40 equipped with a lockup clutch 42. The transmission 50 controls a gear ratio, which is the ratio between the rotation speed of the input shaft 52 and the rotation speed of an output shaft 54. The output shaft 54 is mechanically coupled to driven wheels 60.

A controller 70 controls the internal combustion engine 10. The controller 70 operates operated units of the internal combustion engine 10, such as the throttle valve 14, the fuel injection valve 16, and the ignition device 26, thereby controlling, for example, the torque and the ratios of exhaust components. The controller 70 also controls the torque converter 40. The controller 70 operates the lockup clutch 42 to control the engagement state of the lockup clutch 42. The controller 70 also controls the transmission 50. The controller 70 controls the transmission 50, thereby controlling the gear ratio. FIG. 1 shows operation signals MS1 to MS5 respectively corresponding to the throttle valve 14, the fuel injection valve 16, the ignition device 26, the lockup clutch 42, and the transmission 50.

In order to control the internal combustion engine 10, the controller 70 refers to an output signal Scr of a crank angle sensor 80, a depression amount of an accelerator pedal 84 (accelerator operation amount PA) detected by an accelerator sensor 82, and a vehicle speed V detected by a vehicle speed sensor 86. The controller 70 also refers to positional data Pgps obtained by a global positioning system (GPS 90) and a paddle operation variable Vps determined by operation of a paddle switch 92. The paddle switch 92 is a human-machine interface that allows the user of the vehicle VC1 to instruct the transmission 50 to switch the gear ratio.

The controller 70 includes a CPU 72, a ROM 74, a nonvolatile memory that can be electrically rewritten (memory device 76), and peripheral circuitry 78. The CPU 72, the ROM 74, the memory device 76, and the peripheral circuitry 78 are connected together through a local network 79 to communicate with one another. The peripheral circuitry 78 includes a circuit that generates a clock signal regulating internal operations, a power supply circuit, and a reset circuit.

The ROM 74 stores a control program 74a. The memory device 76 also stores mapping data DM and geographical map data DG. The input variables of the mapping data DM include a current gear ratio GR of the transmission 50, the accelerator operation amount PA, the vehicle speed V, a gradient SL of the road, and a curvature CU of the road, and the output variables of the mapping data DM include the gear ratio GR of the transmission 50. Mapping data includes combinations of discrete values of input variables and values of output variables each corresponding to a value of the input variables.

Figure 2:
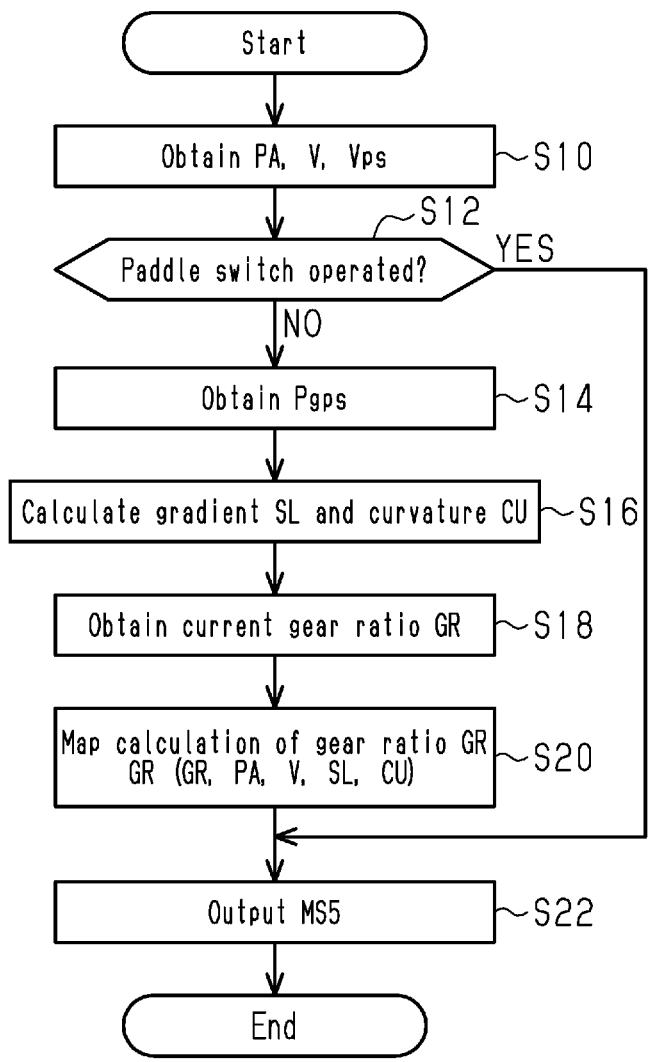
FIG. 2 is a flowchart showing a procedure of processes executed by the controller.

FIG. 2 shows a procedure of processes in which the controller 70 controls the gear ratio of the transmission 50. The process shown in FIG. 2 is performed by the CPU 72 repeatedly executing programs stored in the ROM 74 at a predetermined interval. In the following description, the number of each step is represented by the letter S followed by a numeral.

In the series of processes shown in FIG. 2, the CPU 72 first acquires the accelerator operation amount PA, the vehicle speed V, and the paddle operation variable Vps (S10). The CPU 72 first determines whether the paddle switch 92 has been operated on the basis of the paddle operation variable Vps (S12). If the paddle switch 92 has not been operated (S12: NO), the CPU 72 obtains the positional data Pgps (S14). On the basis of the positional data Pgps and the geographical map data DG, the CPU 72 calculates the gradient SL and the curvature CU of the road on which the vehicle VC1 is traveling (S16). That is, the CPU 72 identifies a position on the map shown by the geographical map data DG using the positional data Pgps, and identifies the gradient SL and the curvature CU at the identified position. Next, the CPU 72 obtains the current gear ratio GR (S18). The CPU 72 obtains, through map calculation, the gear ratio GR on the basis of the mapping data DM using, as inputs, the current gear ratio GR, the accelerator operation amount PA, the vehicle speed V, the road gradient SL, and the road curvature CU (S20). In the map calculation, when the value of the input variable matches one of the values of input variable on the mapping data, the value of the corresponding output variable of the map data is used as the calculation result. In contrast, when the value of the input variable does not match any of the values of the input variable on the mapping data, a value obtained by interpolation of multiple values of the output variable included in the map data is used as the calculation result.

When completing the process of S20, the CPU 72 outputs the operation signal MS5 to the transmission 50 so as to set the gear ratio of the transmission 50 to the gear ratio GR, which has been calculated in the process of S20 (S22). In contrast, when making an affirmative determination in the process of S12, the CPU 72 outputs the operation signal MS5 to the transmission 50 so as to set the gear ratio of the transmission 50 to a gear ratio corresponding to the operation of the paddle switch 92 (S22).

When completing the process of S22, the CPU 72 temporarily suspends the series of processes shown in FIG. 2.

Figure 3:
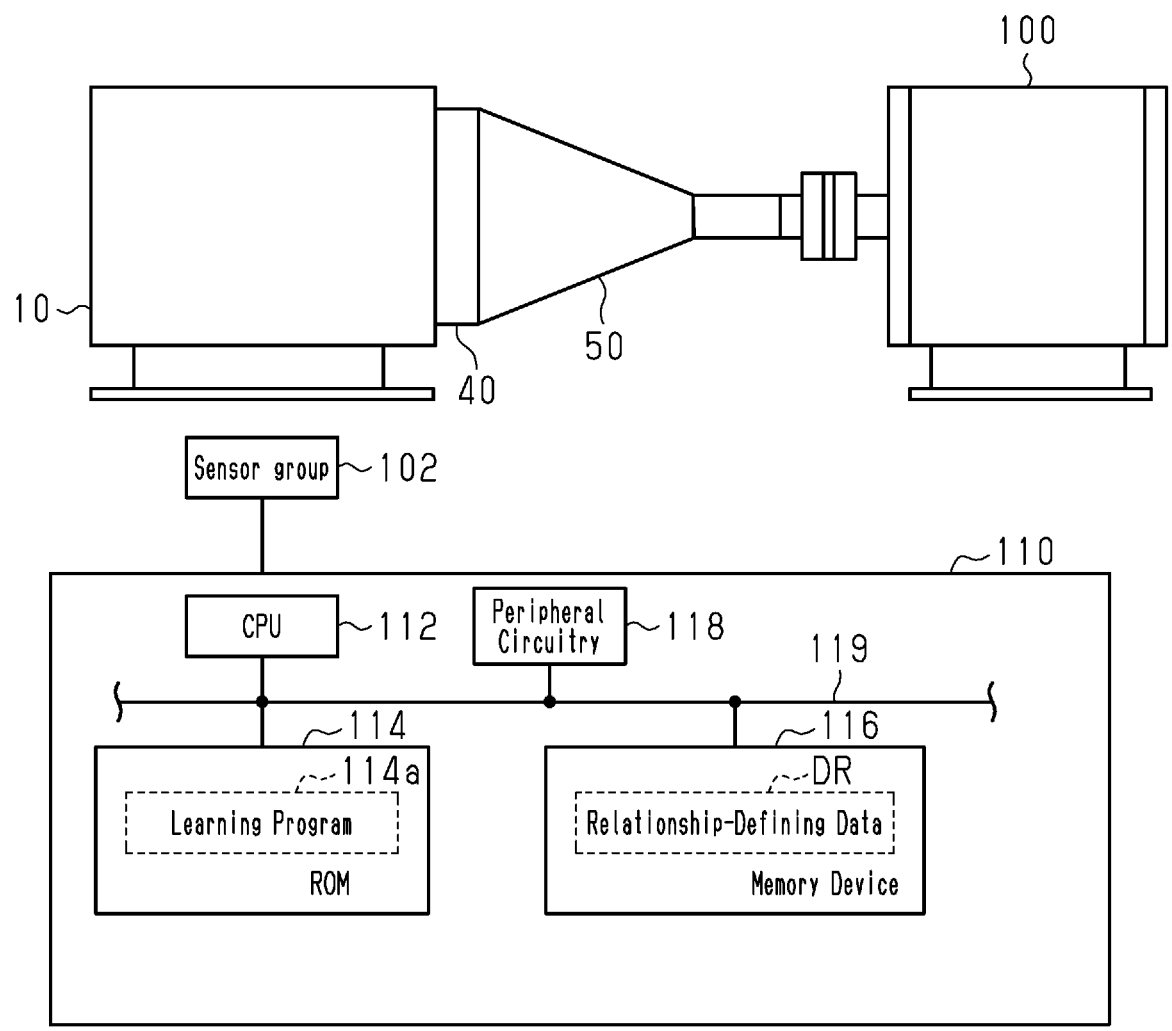
FIG. 3 is a diagram showing a system that generates map data.

FIG. 3 shows a system that generates the mapping data DM.

As shown in FIG. 3, the crankshaft 28 of the internal combustion engine 10 is mechanically coupled to a dynamometer 100 via the torque converter 40 and the transmission 50. A sensor group 102 detects a variety of state variables during operation of the internal combustion engine 10. The results of the detection are delivered to a generator 110, which is a computer that generates the mapping data DM. The sensor group 102 includes sensors mounted on the vehicle VC1 shown in FIG. 1.

The generator 110 includes a CPU 112, a ROM 114, a nonvolatile memory that can be electrically rewritten (memory device 116), and peripheral circuitry 118. The CPU 112, the ROM 114, the memory device 116, and the peripheral circuitry 118 are connected together through a local network 119 to communicate with one another. The memory device 116 also stores relationship-defining data DR. The relationship-defining data DR defines the relationship of the gear ratio GR, which is an action variable, with state variables such as the current gear ratio GR, the accelerator operation amount PA, the vehicle speed V, the road gradient SL, and the road curvature CU. The ROM 114 stores a learning program 114a for learning the relationship-defining data DR through reinforcement learning.

Figure 4:
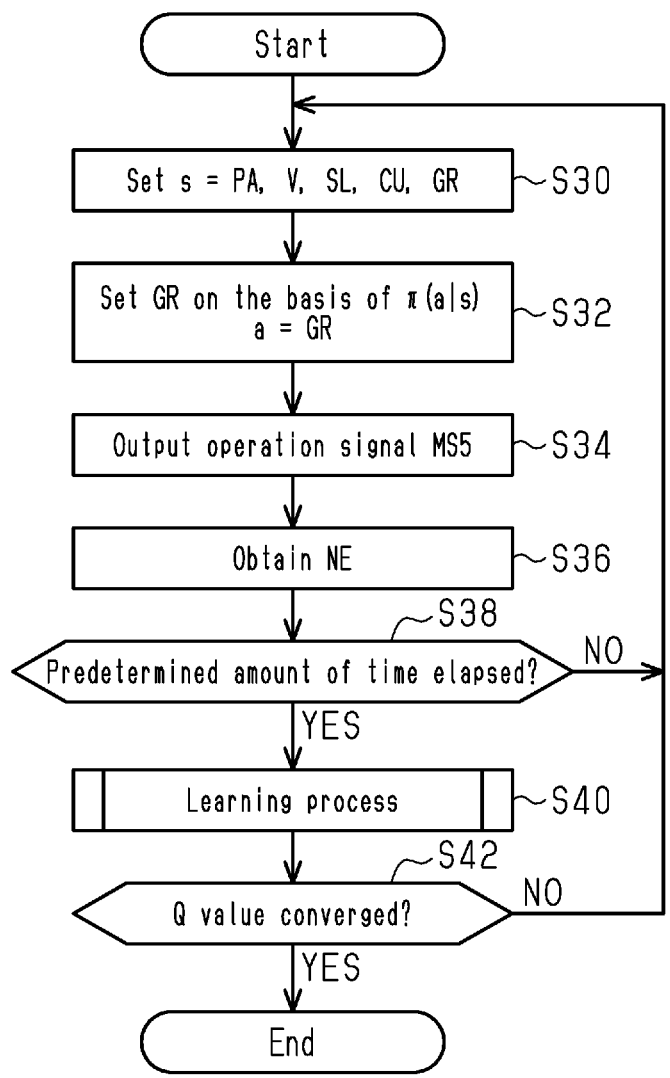
FIG. 4 is a flowchart showing a procedure of processes executed by the system.

FIG. 4 shows a procedure of processes executed by the generator 110. The processes shown in FIG. 4 are implemented by the CPU 112 executing the learning program 114a stored in the ROM 114.

In the series of processes shown in FIG. 4, the CPU 112 sets a state s, which includes the accelerator operation amount PA, the vehicle speed V, the road gradient SL, the road curvature CU, and the current gear ratio GR (S30). The system shown in FIG. 3 does not include the accelerator pedal 84. Thus, the generator 110 virtually generates the accelerator operation amount PA by simulating the state of the vehicle VC1. The virtually generated accelerator operation amount PA is regarded as a detection value of the state of the vehicle. Likewise, the system shown in FIG. 3 does not include any vehicle or any road. Thus, the generator 110 sets the road on which the vehicle travels and causes the dynamometer 100 to generate the torque acting on the output shaft 54 of the transmission 50 when the vehicle travels on the set-up road. The generator 110 sequentially calculates the vehicle speed V in accordance with the torque acting on the output shaft 54. The vehicle speed V is also regarded as a detection value of the state of the vehicle, and the gradient SL and the curvature CU are regarded as variables indicating the amount of deviation of the road on which the vehicle is traveling from a reference road. The reference road is a road of which the gradient SL and the curvature CU are zero. The reference road is assumed to be a substantially flat road with a predetermined value of friction coefficient. The predetermined value is set to the friction coefficient of a typical road when the weather is fine. The predetermined value is therefore set to be larger than the friction coefficient of a road when it is raining.

Next, in accordance with a policy $\pi$ defined by the relationship-defining data DR, the CPU 112 sets the gear ratio GR as an action a that corresponds to the state s, which has been obtained in the process of S30 (S32). The relationship-defining data DR is used to define an action value function Q and the policy $\pi$. The action value function Q is a table-type function representing values of expected return in accordance with six-dimensional independent variables of the state s and the action a. When a state s is provided, the action value function Q includes values of the action a at which the independent variables correspond to the provided state s. Among these values, the one at which the expected return is maximized is referred to as a greedy action. The policy $\pi$ defines rules with which the greedy action is preferentially selected, and an action a different from the greedy action is selected with a predetermined probability.

Specifically, the number of the values of the independent variables of the action value function Q is obtained by reducing, by some amount, all the possible combinations of the state s and the action a, using human knowledge and the like. That is, when the gear ratio GR in the state s is the first gear, only the first gear or the second gear is permitted as the gear ratio GR in the action a. In the first embodiment, reduction of the dimensions using human knowledge and the like limits the number of the possible values of the independent variables of the action value function Q to a number less than or equal to 10 to the fourth power, and preferably, to a number less than or equal to 10 to the third power.

As in the process of S22, the CPU 112 outputs the operation signal MS5 on the basis of the gear ratio GR set by the process of S32 (S34). Next, the CPU 112 obtains the rotation speed NE of the internal combustion engine 10 (S36). The CPU 112 calculates the rotation speed NE on the basis of the output signal Scr of the crank angle sensor 80, which is one of the sensor group 102. The CPU 112 also determines whether a predetermined amount of time has elapsed from the later one of the point in time at which the series of processes of FIG. 4 was executed for the first time and the point in time at which the process of S40 was executed (S38). When determining that the predetermined amount of time has elapsed (S38: YES), the CPU 112 updates the action value function Q through reinforcement learning (S40).

Figure 5:
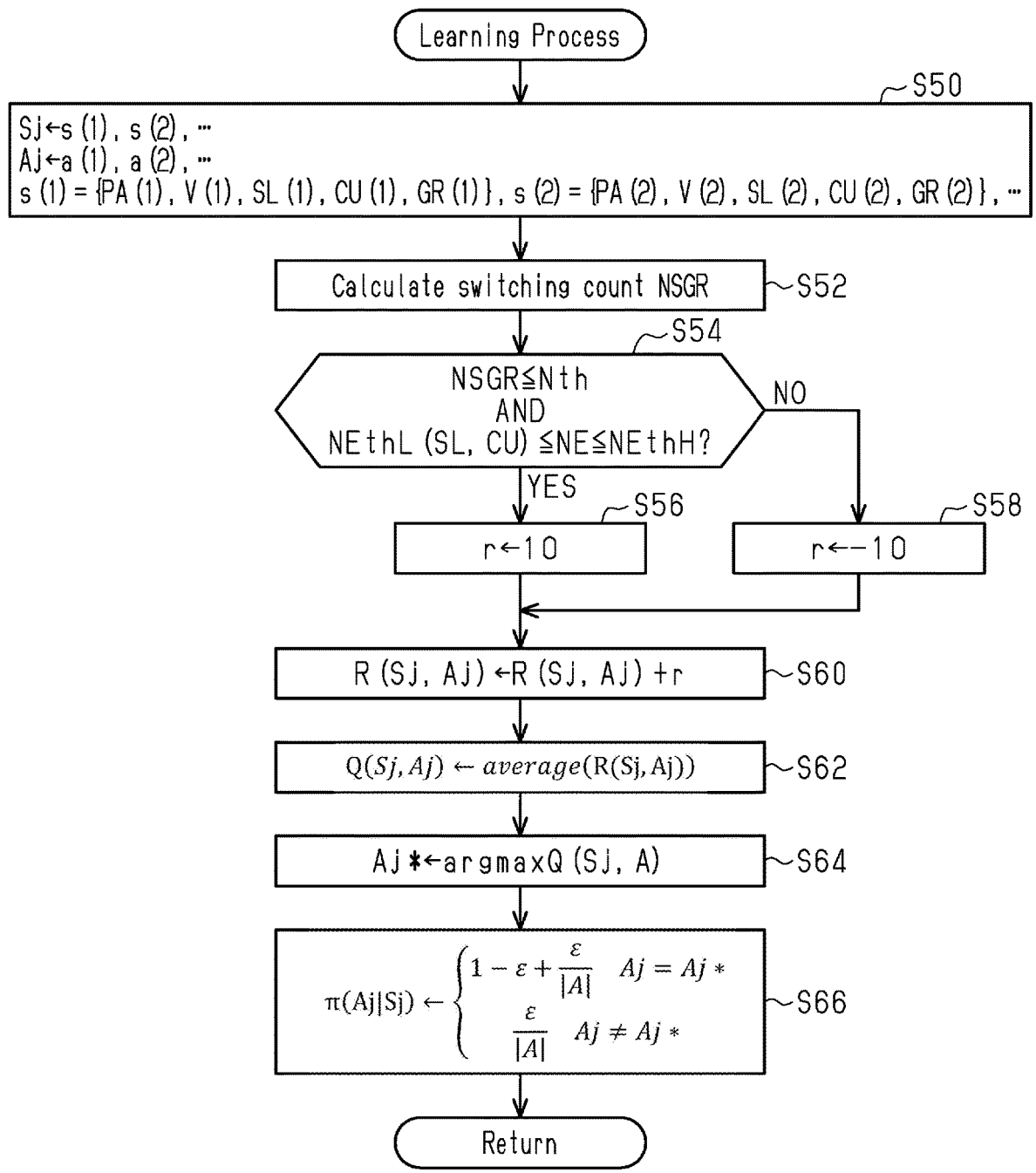
FIG. 5 is a detailed flowchart showing a procedure of a learning process.

FIG. 5 illustrates the details of the process of S40.

In the series of processes shown in FIG. 5, the CPU 112 acquires time-series data of the state s and the action a within the predetermined amount of time (S50). In FIG. 5, variables of which the numbers in parentheses are different are variables at different sampling points in time. An accelerator operation amount PA(1) and an accelerator operation amount PA(2) are sampled at different times. The time-series data of the action a in the predetermined amount of time is an action set Aj. The time-series data of the state s in the predetermined amount of time is a state set Sj.

Next, the CPU 112 calculates a switching count NSGR, which is the number of times the gear ratio has been switched, on the basis of the time-series data of the gear ratio GR in the state set Sj (S52). Then, the CPU 112 determines whether the logical conjunction of the following conditions (a) and (b) is true: the condition (a) is that the switching count NSGR is less than or equal to a predetermined count Nth; and the condition (b) is that the sampled values of the rotation speed NE in a predetermined amount of time are all within the range from a lower speed limit NEthL to an upper speed limit NHthH (S54). The logical conjunction being true corresponds to the standard required for drivability being met.

The CPU 112 varies the lower speed limit NEthL in accordance with the gradient SL and the curvature CU. Specifically, the CPU 112 sets the lower speed limit NEthL to a larger value when the gradient SL is large than when the gradient SL is small. Also, the CPU 112 sets the lower speed limit NEthL to a larger value when the curvature CU is large than when the curvature CU is small.

When the logical conjunction is true (S54: YES), the CPU 112 assigns 10 to a reward r (S56). When the logical conjunction is false (S54: NO), the CPU 112 assigns −10 to the reward r (S58). When completing the process of S56 or S58, the CPU 112 updates the relationship-defining data DR stored in the memory device 116 shown in FIG. 3. In the first embodiment, the ε-soft on-policy Monte Carlo method is used.

That is, the CPU 112 adds the reward r to respective returns R(Sj, Aj), which are determined by combinations of the states obtained through the process of S50 and actions corresponding to the respective states (S60). R(Sj, Aj) collectively represents the returns R each having one of the elements of the state set Sj as the state and one of the elements of the action set Aj as the action. Next, the CPU 112 averages each of the returns R(Sj, Aj), which are determined by combinations of the states and the corresponding actions obtained through the process of S50, and assigns the averaged values to the corresponding action value functions Q(Sj, Aj) (S62). The averaging process simply needs to be a process of dividing the return R, which is calculated through the process of S60, by the number of times the process S60 has been executed. The initial value of the return R simply needs to be set to zero.

Next, for each of the states obtained through the process of S50, the CPU 112 assigns, to an action Aj*, the action a at the time when the corresponding action value function Q(Sj, A) has the maximum value (S64). The variable A represents an arbitrary action that can be taken. The action Aj* can have different values depending on the type of the state obtained through the process of S50. However, in view of simplification, the action Aj* has the same symbol regardless of the type of the state in the present description.

Next, the CPU 112 updates a policy π (Aj|Sj) corresponding to each of the states obtained through the process of S50 (S66). That is, the CPU 112 sets the selection probability of the action Aj* selected through S64 to (1−ε)+ε/|A|, where |A| represents the total number of actions. The number of the actions other than the action Aj* is represented by |A|−1. The CPU 112 sets the selection probability of each of the actions other than the action Aj* to ε/|A|. The process of S66 is based on the action value function Q, which has been updated through the process of S62. Accordingly, the relationship-defining data DR, which defines the relationship between the state s and the action a, is updated to increase the return R.

When the process of step S66 is completed, the CPU 112 temporarily suspends the series of processes shown in FIG. 5.

Referring back to FIG. 4, when the process of S40 is completed, the CPU 112 determines whether the action value function Q has converged (S42). The CPU 112 simply needs to determine that the action value function Q has converged when the number of consecutive times the updated amount of the action value function Q in the process of S40 is less than or equal to a predetermined value has reached a predetermined number of times. When the action value function Q has not converged (S42: NO) or when a negative determination is made in the process of S38, the CPU 112 returns to the process of S30. When the action value function Q has converged (S52: YES), the CPU 112 temporarily suspends the series of processes shown in FIG. 4.

Figure 6:
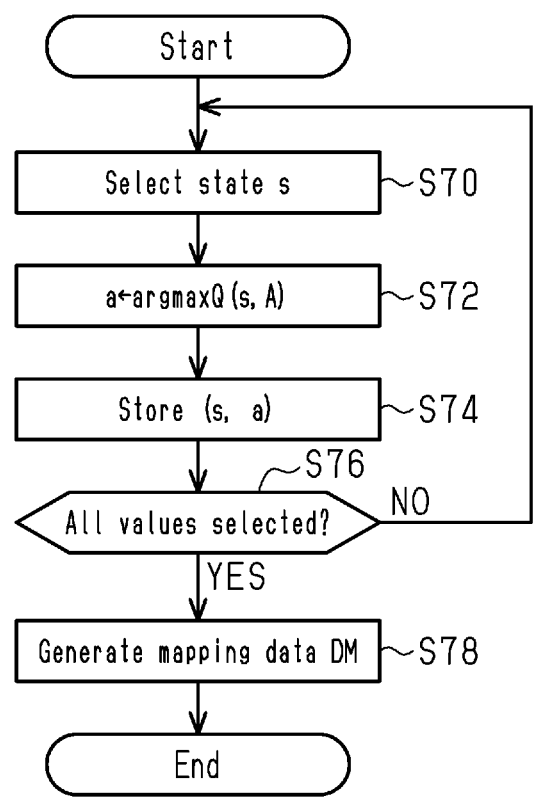
FIG. 6 is a flowchart showing a procedure of a mapping data generating process.

The processes executed by the generator 110 include the one shown in FIG. 6. Specifically, FIG. 6 shows a procedure of processes executed by the generator 110 to generate the mapping data DM on the basis of the action value function Q, which is learned particularly in the process of FIG. 4. The processes shown in FIG. 6 are implemented by the CPU 112 executing the learning program 114a stored in the ROM 114.

In the series of processes shown in FIG. 6, the CPU 112 first selects one of the states s, which are input variables of the mapping data DM (S70). Next, the CPU 112 selects, from the action value functions Q(s, A) corresponding to the state s, the action a that maximizes the value of the action value function Q (S72). That is, the CPU 112 selects the action a through a greedy policy. The CPU 112 stores the combination of the state s and the action a in the memory device 116 (S74).

Next, the CPU 112 determines whether all the values of the input variables of the mapping data DM have been selected in the process of S70 (S76). When there are values that have not been selected (S76: NO), the CPU 112 returns to the process of S70. In contrast, when all the values have been selected (S76: YES), the CPU 112 generates the mapping data DM on the basis of the data that has been stored through the process of S74 (S78). The value of an output variable that corresponds to the input variable of the mapping data DM the value of which is the state s is defined as a corresponding action a.

When completing the process of step S78, the CPU 112 temporarily suspends the series of processes shown in FIG. 6.

The operation and advantages of the first embodiment will now be described.

In the system shown in FIG. 3, the CPU 112 learns the action value function Q through reinforcement learning. When the value of the action value function Q converges, the CPU 112 determines that the action that is suitable for meeting the standard required for drivability has been learned. Then, for each of the states that are input variables of the mapping data DM, the CPU 112 selects an action that maximizes the action value function Q and stores the combinations of the states and the actions in the memory device 116. Next, the CPU 112 generates the mapping data DM on the basis of the combinations of the states and actions stored in the memory device 116. Thus, an appropriate gear ratio GR that corresponds to the accelerator operation amount PA, the vehicle speed V, the road gradient SL, and the road curvature CU can be set without excessively increasing the man-hours by skilled workers.

Particularly, in the first embodiment, the gear ratio GR is determined on the basis of not only the accelerator operation amount PA and the vehicle speed V, but also the gradient SL and the curvature CU. The driven wheels 60 tend to be required to exert a larger torque when the gradient SL is large than when the gradient SL is small. Also, the user tends to more frequently switch between operation of the accelerator and operation of the brakes when driving in a curve than when driving on a straight road. Accordingly, the appropriate gear ratio varies in accordance with the gradient SL and the curvature CU. Thus, the gear ratio GR is set appropriately by setting the gear ratio GR in accordance with the gradient SL and the curvature CU. However, when the gear ratio GR is set on the basis of the gradient SL and the curvature CU, the number of dimensions of the mapping data DM and the number of adaptation steps are increased as compared to a case in which the gear ratio GR is set on the basis of only the accelerator operation amount PA and the vehicle speed V. Thus, it is particularly advantageous to use reinforcement learning as in the first embodiment.

The first embodiment further has the following operation and advantages.

(1) The memory device 76 of the controller 70 stores the mapping data DM, not the action value function Q. The CPU 72 thus sets the gear ratio GR through map calculation using the mapping data DM. This configuration reduces the computation load as compared to a case in which a process for selecting the maximum value of the action value function Q is executed.

Second Embodiment

A second embodiment will now be described with reference to the drawings. The differences from the first embodiment will mainly be discussed.

Figure 7:
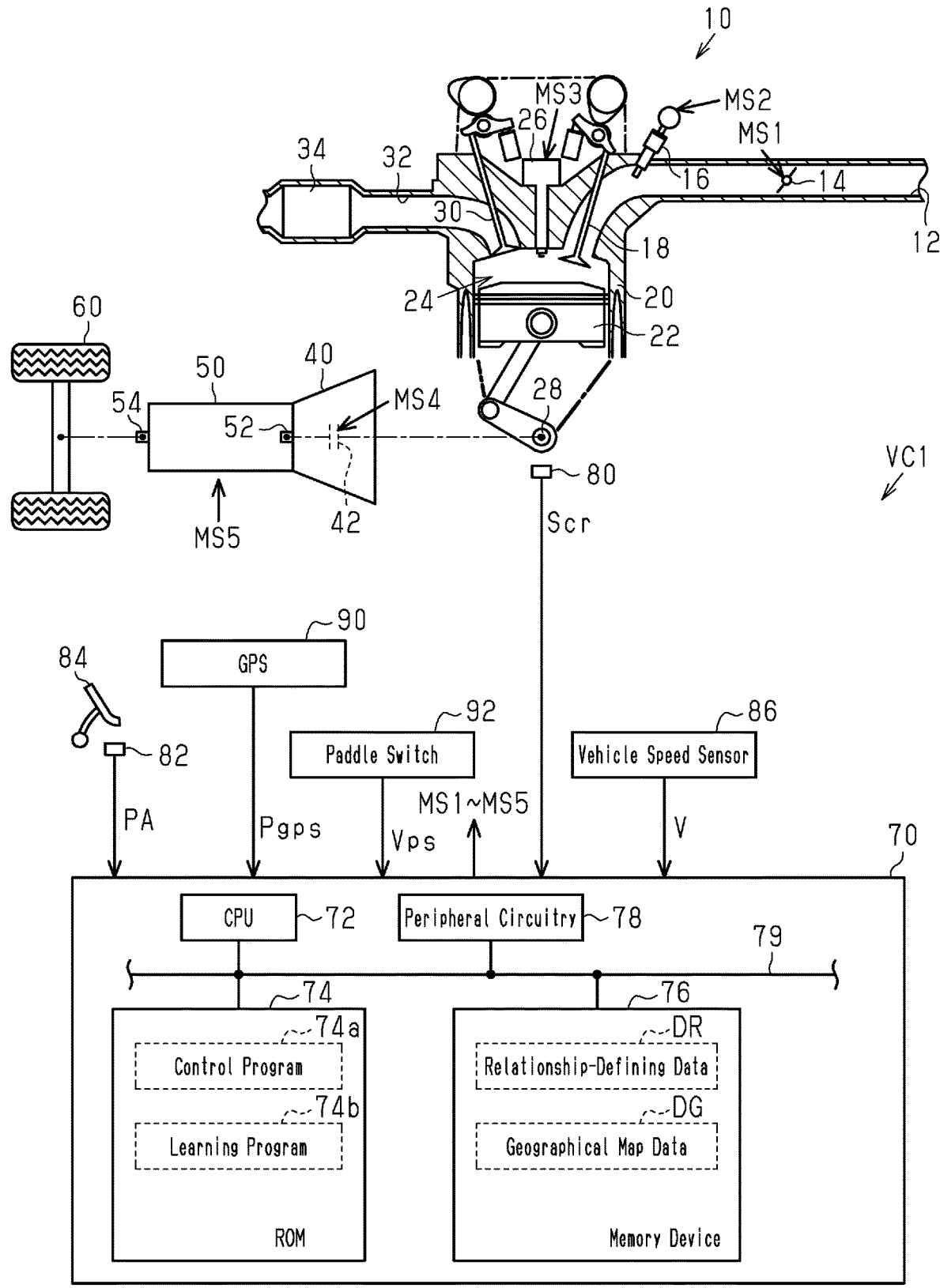
FIG. 7 is a diagram showing a controller according to a second embodiment and a drive system.

FIG. 7 shows a drive system of a vehicle VC1 and a controller according to a second embodiment. In FIG. 7, the same reference numerals are given to the components that correspond to those shown in FIG. 1.

As shown in FIG. 7, the ROM 74 of the second embodiment stores a learning program 74b in addition to the control program 74a. The memory device 76 also stores relationship-defining data DR instead of the mapping data DM. The relationship-defining data DR is learned data, which is data that has been learned through the process of FIG. 4.

Figure 8:
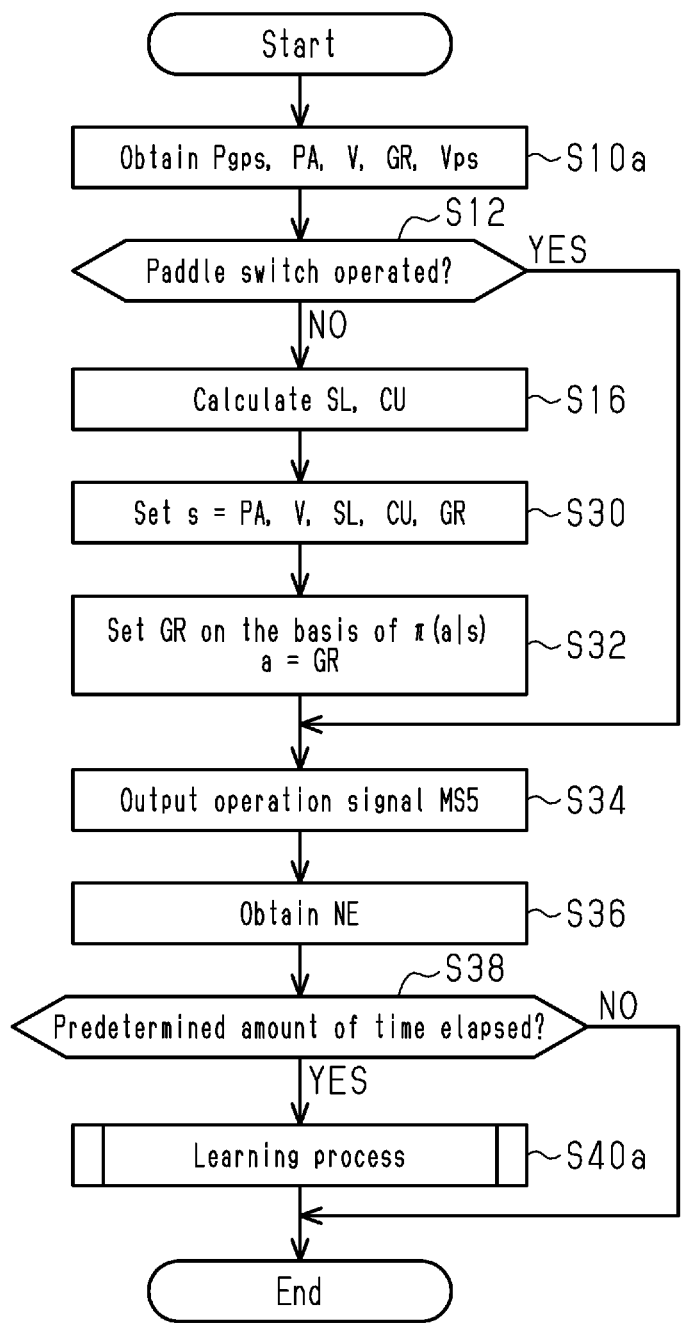
FIG. 8 is a flowchart showing a procedure of processes executed by the controller.

FIG. 8 shows a procedure of processes executed by a controller 70 according to the second embodiment. The processes shown in FIG. 8 are implemented by the CPU 72 repeatedly executing the control program 74a and the learning program 74b stored in the ROM 74 at predetermined intervals. In FIG. 8, the same step numbers are given to the processes that correspond to those in FIG. 4.

In the series of processes shown in FIG. 8, the CPU 72 first acquires the positional data Pgps, the accelerator operation amount PA, the vehicle speed V, the gear ratio GR, and the paddle operation variable Vps (S10*a*). Next, after executing the processes of S12 and S16 of FIG. 2, the CPU 72 executes the processes of S30 and S32 of FIG. 4. When the process of S32 is completed or when the determination is affirmative in the process of S12, the CPU 72 executes the processes of S34 to S38. However, when an affirmative determination is made in the process of S12, the process of S34 outputs an operation signal MS5 for operating the transmission 50 in accordance with the paddle operation variable Vps. When determining that a predetermined amount of time has elapsed (S38: YES), the CPU 72 executes a process similar to the process of S40 (S40*a*).

Figure 9:
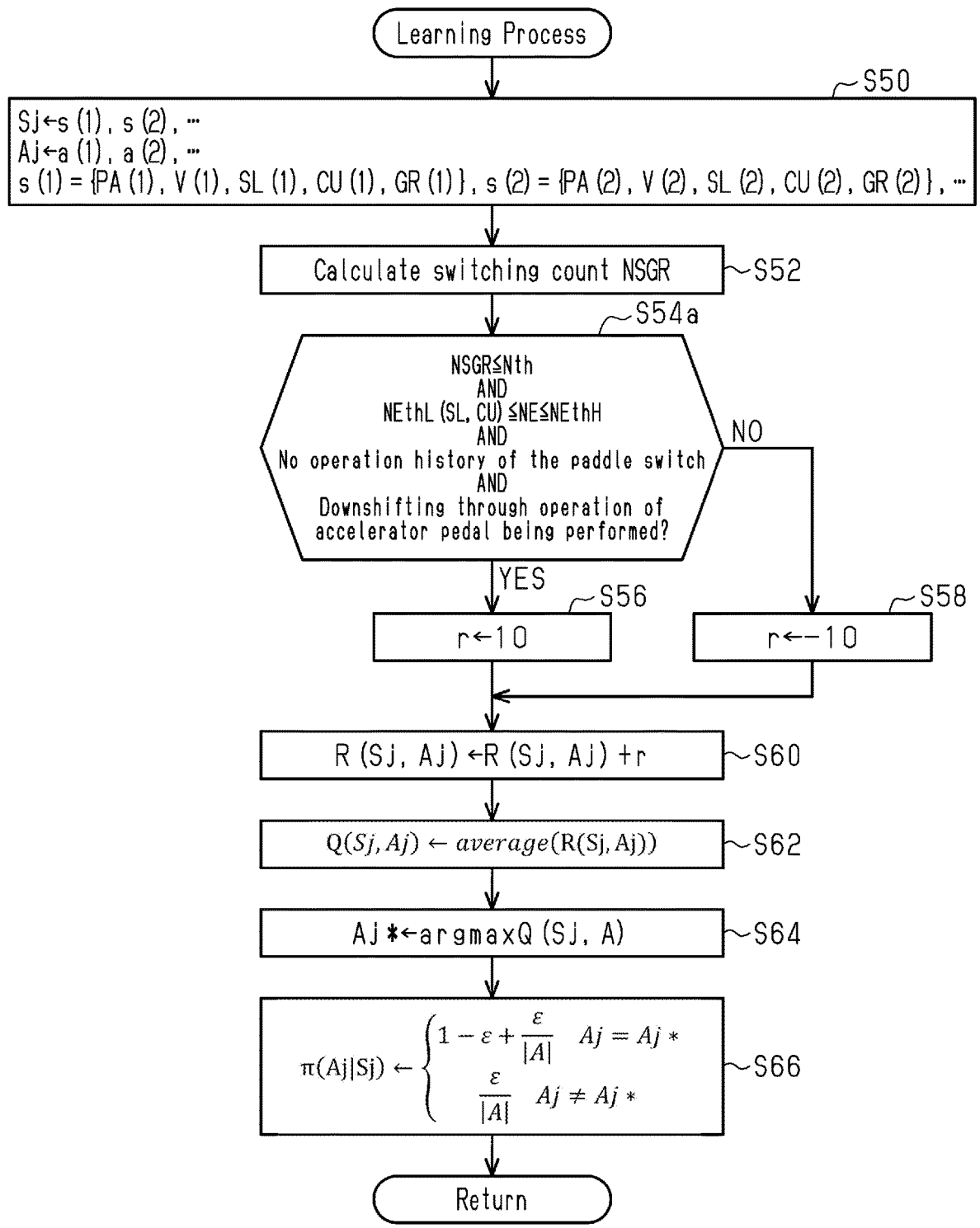
FIG. 9 is a detailed flowchart showing a procedure of a learning process.

FIG. 9 illustrates the details of the process of S40*a*. In FIG. 9, the same step numbers are given to the processes that correspond to those in FIG. 5.

In the series of processes shown in FIG. 9, after executing the processes of S50 and S52, the CPU 72 determines whether the logical conjunction of the condition (a), the condition (b), a condition (c), and a condition (d) is true (S54*a*). The condition (c) is that there is no operation history of the paddle switch 92. The condition (d) is that downshifting through operation of the accelerator pedal 84 is not being performed. In the second embodiment, the logical conjunction being true corresponds to the standard established for drivability being met.

When determining that the logical conjunction is true (S54*a*: YES), the CPU 72 proceeds to the process of S56. In contrast, when determining that the logical conjunction is false (S54*a*: NO), the CPU 72 proceeds to the process of S58.

When the process of S56 or S58 is completed, the CPU 72 executes the processes of S60 to S66 and temporarily suspends the process S40*a* of FIG. 8.

Referring back to FIG. 8, the CPU 72 temporarily suspends the series of processes shown in FIG. 8 when the process of S40*a* is completed or when a negative determination is made in the process of S38. The processes of S10*a*, S12, S16, and S30 to S38 are implemented by the CPU 72 executing the control program 74a, and the process of S40*a* is implemented by the CPU 72 executing the learning program 74b.

As described above, the controller 70 is provided with the relationship-defining data DR and the learning program 74b in the second embodiment. This increases the learning frequency as compared to the case of the first embodiment.

The second embodiment further has the following operation and advantages.

(2) A larger reward is provided when there is no operation history of the paddle switch 92 within a predetermined amount of time than when there is an operation history. This allows a shift schedule that reflects the preference of the user to be learned through reinforcement learning.

(3) A larger reward is provided when kickdown has occurred within a predetermined amount of time than when kickdown has not occurred. This allows a shift schedule that reflects the preference of the user to be learned through reinforcement learning.

Third Embodiment

A third embodiment will now be described with reference to the drawings. The differences from the second embodiment will mainly be discussed.

In the third embodiment, the relationship-defining data DR is updated outside the vehicle VC1.

Figure 10:
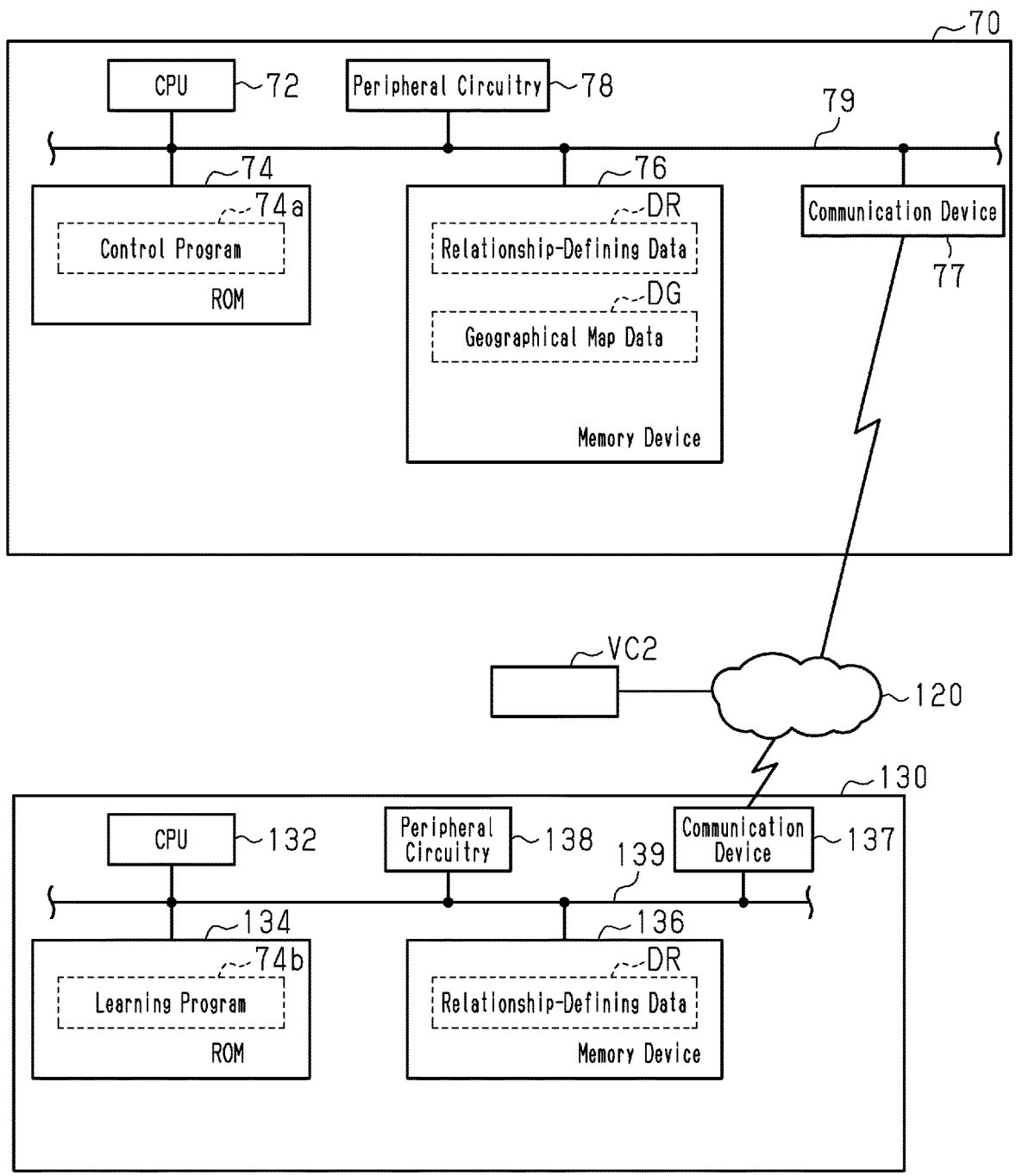
FIG. 10 is a diagram showing a system according to a third embodiment.

FIG. 10 shows the configuration of a control system according to the third embodiment that performs reinforcement learning. In FIG. 10, the same reference numerals are given to the components that correspond to those shown in FIG. 1.

The ROM 74 of the controller 70 in the vehicle VC1 shown in FIG. 10 stores the control program 74a, but does not store the learning program 74b. The controller 70 includes a communication device 77. The communication device 77 communicates with a data analysis center 130 via a network 120 outside the vehicle VC1.

The data analysis center 130 analyzes data transmitted from vehicles VC1, VC2, . . . . The data analysis center 130 includes a CPU 132, a ROM 134, a nonvolatile memory that can be electrically rewritten (memory device 136), peripheral circuitry 138, and a communication device 137. The CPU 132, the ROM 134, the memory device 136, and the peripheral circuitry 138 are connected together through a local network 139 to communicate with one another. The ROM 134 stores a learning program 74b. The memory device 136 stores relationship-defining data DR.

Figure 11A:
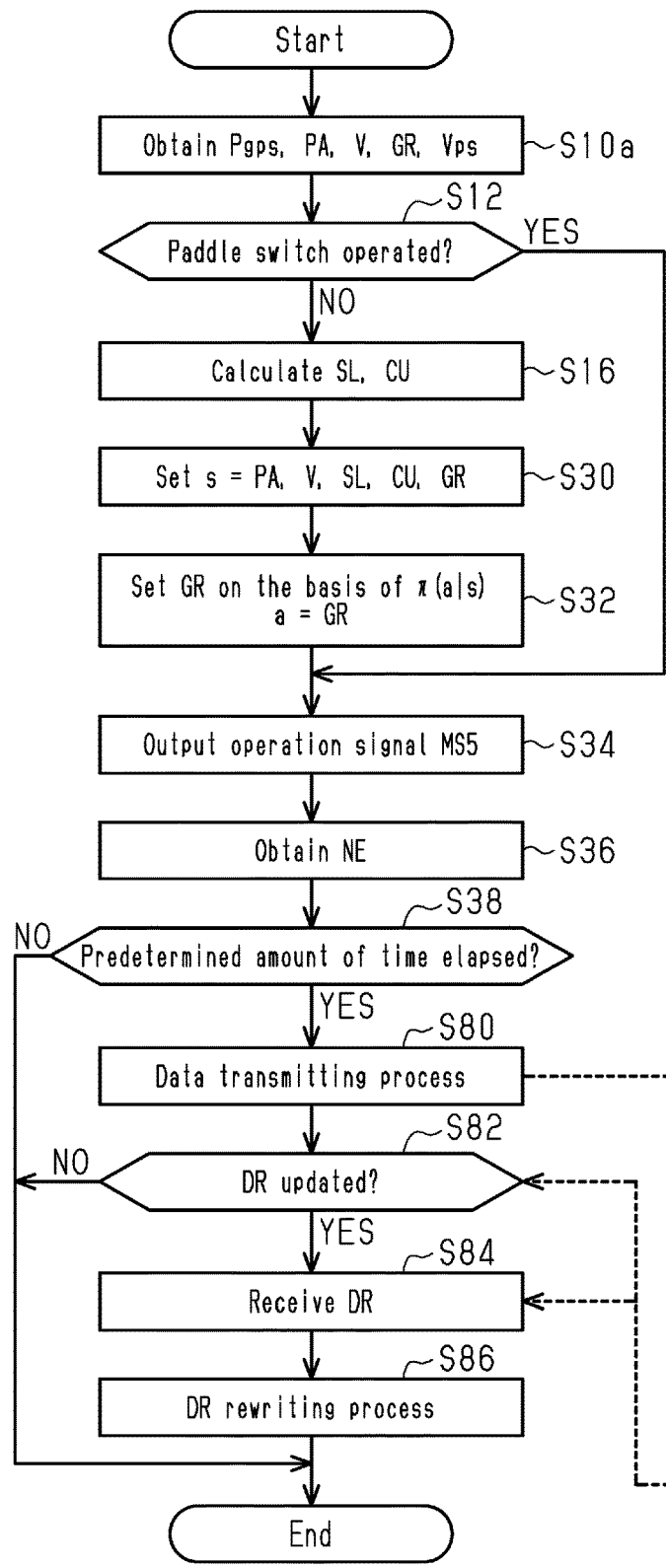
FIGS. 11A and 11B are flowcharts showing a procedure of processes executed by the system.
Figure 11B:
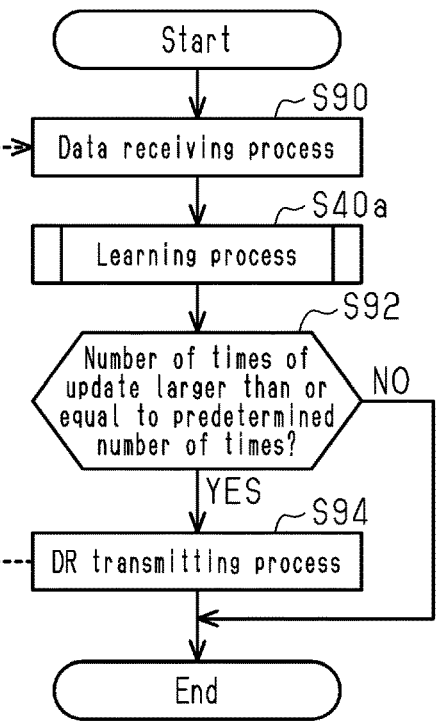

FIGS. 11A and 11B show a procedure of processes of reinforcement learning according to the third embodiment. The processes shown in FIG. 11A are implemented by the CPU 72 executing the control program 74a stored in the ROM 74 shown in FIG. 10. The processes shown in FIG. 11B are implemented by the CPU 132 executing the learning program 74*b* stored in the ROM 134. In FIGS. 11A and 11B, the same step numbers are given to the processes that correspond to those in FIG. 8. The process shown in FIGS. 11A and 11B will now be described with reference to the temporal sequence of the reinforcement learning.

In the series of processes shown in FIG. 11A, the CPU 72 executes the processes of S10*a*, S12, S16, and S30 to S38. When making an affirmative determination in the process of S38, the CPU 72 operates the communication device 77 to transmit data necessary for the update process of the relationship-defining data DR (S80). The transmitted data includes the state s set in the process of S30 within a predetermined amount of time, the action a set in the process of S32 within the predetermined amount of time, and the rotation speed NE obtained in the process of S36 within the predetermined amount of time.

As shown in FIG. 11B, the CPU 132 receives the transmitted data (S90), and updates the relationship-defining data DR on the basis of the received data (S40). The CPU 132 determines whether the number of times of update of the relationship-defining data DR is larger than or equal to a predetermined number of times (S92). When determining that the number of times of update is larger than or equal to the predetermined number of times (S92: YES), the CPU 132 operates the communication device 137 to transmit the relationship-defining data DR to the vehicle VC1, which transmitted the data that was received through the process of S90 (S94). When the process of S94 is completed or when the determination is negative in the process of S92, the CPU 132 temporarily suspends the series of processes shown in FIG. 11B.

As shown in FIG. 11A, the CPU 72 determines whether there is update data (S82). When determining that there is update data (S82: YES), the CPU 72 receives the updated relationship-defining data DR (S84). Then, the CPU 72 rewrites the relationship-defining data DR used in the process of S32 with the received relationship-defining data DR (S86). When the process of S86 is completed or when the determination is negative in the process of S38 or S82, the CPU 72 temporarily suspends the series of processes shown in FIG. 11A.

As described above, the relationship-defining data DR is updated outside the vehicle VC1. This reduces the computation load on the controller 70. Further, if the process of S40*a* is executed by receiving data from multiple vehicles VC1, VC2 in the process of S90, the number of data sets used for learning can be increased easily.

Correspondence

The correspondence between the items in the above embodiments and the items the WHAT IS CLAIMED IS section is as follows. Below, the correspondence is shown for each claim number.

[1] The execution device and the memory device correspond to the CPU 72 and the set of the ROM 74 and the memory device 76 in FIGS. 1 and 7, respectively, to the CPU 112 and the set of the ROM 114 and the memory device 116 in FIG. 3, respectively, and to the CPUs 72, 132 and the set of the ROMs 74, 134 and the memory devices 76, 136 in FIG. 10, respectively. The deviation variable corresponds to the gradient SL and the curvature CU. The state of the vehicle corresponds to the accelerator operation amount PA and the vehicle speed V. The operation process corresponds to the process of S34, and the obtaining process corresponds to the processes of S30, S36. The reward calculating process corresponds to the processes of S54 to S58 and the processes of S54*a*, S56, and S58. The update process corresponds to the processes of S60 to S66.

[2] The gradient reference value corresponds to zero degrees.

[3] The curvature reference value corresponds to zero.

[4] The load variable corresponds to the accelerator operation amount PA.

[5] Claim 5 corresponds to the process related particularly to the condition (a) in the process of S54 and the process of S54*a*.

[6] The propelling force generator corresponds to the internal combustion engine 10.

[7] Claim 7 corresponds to the process related to the condition (c) in the process of S54*a*.

[8] Claim 8 corresponds to the process related to the condition (d) in the process of S54*a*.

[9] The control map data corresponds to the mapping data DM.

[10] The execution device and the memory device correspond to the CPU 72 and the set of the ROM 74 and the memory device 76 in FIG. 7, respectively.

[11-13] The first execution device corresponds to the CPU 72 and the ROM 74, and the second execution device corresponds to the CPU 132 and the ROM 134.

Other Embodiments

The above-described embodiments may be modified as follows. The above-described embodiments and the following modifications can be combined as long as the combined modifications remain technically consistent with each other.

Regarding Reference Road and Deviation Variable

In the above-described embodiments, the reference road is a road of which the gradient SL and the curvature CU are zero, and the deviation variables are the gradient SL and the curvature CU. However, the present disclosure is not limited to this. The deviation variable may be defined by using only one of the gradient SL and the curvature CU.

The reference road may be a road of which the surface condition is a predetermined condition. This is achieved by defining the reference road as a road of which the amount of asperities is less than or equal to a predetermined amount, and the friction coefficient is a predetermined value. If the predetermined value is set to the friction coefficient of a normal road when the weather is fine, the deviation variable of a snowy road has a value deviated from the value of the reference road. The deviation variable does not necessarily need to change continuously in accordance with the friction coefficient. The deviation variable may have three values: a value indicating that the road is the same as the reference road, a value indicating that the road is a road when it is raining, and a value indicating that the road is a snowy road. Whether the road is a road when it is raining may be determined on the basis of whether the windshield wipers of the vehicle VC1 are operating, or by obtaining weather information from outside the vehicle VC1. Also, whether the road is a snowy road simply needs to be determined by capturing images of a camera detecting the road surface.

The reference road does not necessarily need to be defined by only one of a predetermined shape or a predetermined condition of the road surface. Instead, the reference road may be defined by these two factors.

Regarding State of Vehicle Determining Relationship-Defining Data DR

The gear ratio is determined in accordance with the current gear ratio GR, the accelerator operation amount PA, and the vehicle speed V, but the state variables used to determine the gear ratio are not limited to these. In place of the accelerator operation amount PA, a variable related to the opening degree of the throttle valve 14 may be employed. The load variable, which represents the load on the propelling force generator, is not limited to the accelerator operation amount PA or the opening degree of the throttle valve 14. The load variable may be the torque of the internal combustion engine 10. In a case in which the propelling force generator is a compression ignition internal combustion engine as described in the Regarding Internal Combustion Engine section below, the load variable may be the injection amount. In a case in which the propelling force generator is a rotating electric machine as described in the Regarding Vehicle section, the load variable may be the torque or the current of the rotating electric machine.

In above-described embodiments, the state variables of the vehicle used to determine the gear ratio include only the current gear ratio GR, but the present disclosure is not limited to this. The state variables of the vehicle used to determine the gear ratio may include time-series data of the gear ratio GR.

The state variables of the vehicle used to determine the gear ratio do not necessarily include the current gear ratio. The gear ratio GR may be totally excluded from the state variables of the vehicle used to determine the gear ratio, and hysteresis may be provided to suppress frequent switching of the gear ratio, instead. This can be achieved by prohibiting switching of the gear ratio in a predetermined amount of time from the preceding switching, even if the gear ratio designated by the relationship-defining data DR is different from the current gear ratio.

Regarding Relationship-Defining Data

In the above-described embodiments, the action value function Q is a table-type function. However, the present disclosure is not limited to this. For example, a function approximator may be used.

Instead of using the action value function Q, the policy π may be expressed by a function approximator that uses the state s and the action a as independent variables and uses the probability that the action a will be taken as a dependent variable. In this case, parameters defining the function approximator may be updated in accordance with the reward r. At this time, deviation variables such as the gradient SL and the curvature CU may be included in the state s. However, a function approximator may be provided for each of the deviation variables. Even in this case, the relationship-defining data DR is used to determine which of the function approximators should be used on the basis of the gradient SL and the curvature CU. Thus, the relationship-defining data DR still defines the relationship between the deviation variable and the gear ratio variable.

Regarding Operation Process

When using a function approximator as the action value function Q as described in the Regarding Relationship-Defining Data section above, all the combinations of discrete values related to actions that are independent variables of the table-type function in the above-described embodiments simply need to be input to the action value function Q together with the state s, so as to identify the action a that maximizes the action value function Q. That is, while mainly using the identified action a in the operation, another action may be selected with a predetermined probability.

When the policy π is a function approximator that uses the state s and the action a as independent variables, and uses the probability that the action a will be taken as a dependent variable as in the Regarding Relationship-Defining Data section, the action a simply needs to be selected on the basis of the probability indicated by the policy π.

Regarding Update Map

The ε-soft on-policy Monte Carlo method is used in the processes of S60 to S66. However, an off-policy Monte Carlo method may be used. Also, methods other than Monte Carlo methods may be used. For example, an off-policy TD method may be used. An on-policy TD method such as a SARSA method may be used. Alternatively, an eligibility trace method may be used as an on-policy learning.

When the policy π is expressed using a function approximator, and the function approximator is directly updated based on the reward r as in the Regarding Relationship-Defining Data section, the update map simply needs to be constructed using, for example, a policy gradient method.

The present disclosure is not limited to the configuration in which only one of the action value function Q and the policy π is directly updated using the reward r. The action value function Q and the policy π may be separately updated as in an actor critic method. Alternatively, in an actor critic method, a value function V may be updated in place of the action value function Q.

The value ε, which defines the policy π, does not necessarily need to be a fixed value, but may be changed in accordance with the progress of learning according to predetermined rules.

Regarding Reward Calculating Process

In the process of FIG. 5, a reward is provided depending on whether the logical conjunction of the conditions (a) and (b) is true. However, the present disclosure is not limited to this. It is possible to execute a process that provides a reward depending on whether the condition (a) is met and a process that provides a reward depending on whether the condition (b) is met. Alternatively, it is possible to execute only one of a process that provides a reward depending on whether the condition (a) is met and a process that provides a reward depending on whether the condition (b) is met.

In the process of FIG. 9, a reward is provided depending on whether the logical conjunction of the conditions (a) to (d) is true. However, the present disclosure is not limited to this. It is possible to execute a process that provides a reward depending on whether the condition (a) is met, a process that provides a reward depending on whether the condition (b) is met, a process that provides a reward depending on whether the condition (c) is met, and a process that provides a reward depending on whether the condition (d) is met. Also, it is possible to execute only one of the process that provides a reward depending on whether the condition (a) is met, the process that provides a reward depending on whether the condition (b) is met, the process that provides a reward depending on whether the condition (c) is met, and the process that provides a reward depending on whether the condition (d) is met. Alternatively, only two of the four processes may be executed. Alternatively, only three of the four processes, for example, the processes regarding the conditions (a) to (c), may be executed.

Instead of providing the same reward without exception when the condition (a) is met, a process may be executed in which a larger reward is provided when the switching count NSGR of the gear ratio is small than when the switching count NSGR is large. Alternatively, instead of providing the same reward without exception when the condition (a) is not met, a process may be executed in which a larger reward is provided when the switching count NSGR of the gear ratio is large than when the switching count NSGR is small.

Instead of providing the same reward without exception when the condition (b) is met, a process may be executed in which a reward is varied in accordance with the rotation speed NE. Alternatively, instead of providing the same reward without exception when the condition (b) is not met, a process may be executed in which a reward is varied in accordance with the rotation speed NE.

In the above-described embodiments, the lower speed limit NEthL is varied in accordance with the gradient SL and the curvature CU. However, the present disclosure is not limited to this. In a case in which only one of the gradient SL and the curvature CU is used in the relationship-defining data DR as described in the Regarding Reference Road and Deviation Variable section, the lower speed limit NEthL may be varied in accordance with that one of the gradient SL and the curvature CU. In a case in which the deviation variables include a variable that represents the condition of the road surface as described in the Regarding Reference Road and Deviation Variable section, the lower speed limit NEthL may be varied in accordance with the variable representing the condition of the road surface. The variable for varying the lower speed limit NEthL is not limited to the variable used for the relationship-defining data DR.

A smaller reward may be provided when wheel slip is occurring than when wheel slip is not occurring. The reward may be varied in accordance with the amount of wheel slip. A smaller reward may be provided when the anti-lock braking system (ABS) is operating than when the ABS is not operating.

In the above-described embodiments, the reward calculating process is executed at predetermined intervals. However, the present disclosure is not limited to this. When the determination is affirmative in the process of S12, the reward calculating process may be executed assuming that the episode has ended. It may be assumed that the episode is ended and the reward calculating process may be executed when the logical disjunction is true of a condition that the determination is affirmative in the process of S12 and a condition that the absolute value of the amount of change of the operation amount of the brakes is larger than or equal to a predetermined value. It may be assumed that the episode is ended and the reward calculating process may be executed when the vehicle speed is zero.

Regarding Vehicle Control Data Generating Method

In the process of S32 of FIG. 4, the action is determined on the basis of the action value function Q. However, all the possible actions may be selected with equal probability.

Regarding Control Map Data

The control map data establishes a one-to-one correspondence between the state of the vehicle and the value of the action variable that maximizes the expected return. The control map data then receives the state of the vehicle as an input, and outputs a value of the action variable that maximizes the expected return. The control map data is not limited to the mapping data, but may be a function approximator. When a policy gradient method is used as described in the Regarding Update Map section, this is achieved, a function approximator can be used as the control map data by expressing the policy π using Gaussian distribution that presents the probability of the value of the action variable, expressing the average of the probability using a function approximator, updating the parameter of the function approximator expressing the average, and using, as the control map data, the average subjected to learning process. That is, the average output by the function approximator is regarded as the value of the action variable that maximizes the expected return.

Regarding Vehicle Control System

In the example shown in FIG. 11, the processes of S40a are all executed in the data analysis center 130. However, the present disclosure is not limited to this. The data analysis center 130 may execute the processes of S60 to S66 without executing the processes of S54a, S56, and S58, which are processes for calculating a reward. Also, in the process of S80, the data analysis center 130 may transmit the results of the processes of S56 and S58.

In the example shown in FIG. 11, the process for determining the action based on the policy π (the process of S32) is executed in the vehicle. However, the present disclosure is not limited to this. The vehicle VC1 may transmit the data obtained through the process of S30, and the data analysis center 130 may determine the action a using the transmitted data and transmit the determined action to the vehicle VC1.

The vehicle control system does not necessarily include the controller 70 and the data analysis center 130. In place of the data analysis center 130, a portable terminal of the user may be used. Also, the vehicle control system may include the controller 70, the data analysis center 130, and a portable terminal. This configuration is achieved by executing the process of S32 using the portable terminal.

Regarding Execution Device

The execution device is not limited to a device that includes the CPU 72 (112, 132) and the ROM 74 (114, 134) and executes software processing. At least part of the processes executed by the software in the above-described embodiments may be executed by hardware circuits dedicated to executing these processes such as an application-specific integrated circuit (ASIC). That is, the execution device may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. Multiple software processing devices each including a processor and a program storage device and a plurality of dedicated hardware circuits may be provided.

Regarding Memory Device

In the above-described embodiments, the memory device storing the relationship-defining data DR and the memory device (ROM 74, 114, 134) storing the learning program 74b, 114a and the control program 74a are separate from each other. However, the present disclosure is not limited to this.

Regarding Internal Combustion Engine

The internal combustion engine does not necessarily include, as the fuel injection valve, a port injection valve that injects fuel to the intake passage 12, but may include a direct injection valve that injects fuel into the combustion chamber 24. Further, the internal combustion engine may include a port injection valve and a direct injection valve.

The internal combustion engine is not limited to a spark-ignition engine, but may be a compression ignition engine that uses light oil or the like.

Regarding Vehicle

The vehicle is not limited to a vehicle that includes only an internal combustion engine as a propelling force generator, but may be a hybrid vehicle includes an internal combustion engine and a rotating electric machine. Further, the vehicle may be an electric vehicle or a fuel cell vehicle that includes a rotating electric machine as the propelling force generator, but does not include an internal combustion engine.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle control data generating method that uses a memory device and an execution device, the method comprising:
    storing, in the memory device, a deviation variable related to an amount of deviation of a road on which a vehicle is traveling from a reference road, and relationship-defining data that defines a relationship between a state of the vehicle and a gear ratio variable related to a gear ratio of a transmission mounted on the vehicle; and
    with the relationship-defining data stored in the memory device, causing the execution device to execute
        an operation process that operates the gear ratio of the transmission,
        an obtaining process that obtains the state of the vehicle and the deviation variable based on a detection value of a sensor,
        a reward calculating process that causes, on a basis of the state of the vehicle obtained by the state obtaining process, a reward, that is provided when a characteristic of the vehicle meets a predetermined standard, to be larger than a reward that is provided when the characteristic of the vehicle does not meet the predetermined standard, and
        an update process that updates the relationship-defining data by inputting, to a predetermined update map, the state of the vehicle and the deviation variable obtained by the state obtaining process, and the reward corresponding to the operation of the operation process,
    wherein the update map outputs the relationship-defining data that has been updated to increase an expected return of the reward of a case in which the gear ratio is operated in accordance with the relationship-defining data.

2. The vehicle control data generating method according to claim 1, wherein
    the reference road is a road that meets a standard, the standard being that a gradient of the road is a gradient reference value, and
    the deviation variable obtained by the obtaining process includes a variable related to the gradient of the road.

3. The vehicle control data generating method according to claim 1, wherein
    the reference road is a road that meets a standard, the standard being that a curvature of the road is a curvature reference value, and
    the deviation variable obtained by the obtaining process includes a variable related to the curvature of the road.

4. The vehicle control data generating method according to claim 1, wherein the state of the vehicle includes a vehicle speed and a load variable related to a load on a propelling force generator that supplies force to a driven wheel via the transmission.

5. The vehicle control data generating method according to claim 1, wherein the predetermined standard includes a condition that a switching count of the gear ratio within a predetermined amount of time is less than or equal to a predetermined count, and
    the reward calculating process includes a process that provides a larger reward when the switching count is less than or equal to the predetermined count than when the switching count is larger than the predetermined count.

6. The vehicle control data generating method according to claim 1, wherein
    the predetermined standard includes a condition that a rotation speed of a propelling force generator that supplies force to a driven wheel via the transmission is higher than or equal to a lower speed limit, and
    the reward calculating process includes a process that provides a larger reward when the rotation speed of the propelling force generator is higher than or equal to the lower speed limit than when the rotation speed is lower than the lower speed limit.

7. The vehicle control data generating method according to claim 1, wherein
    the vehicle includes a paddle switch,
    the obtaining process includes a process that obtains an operation state of the paddle switch, and
    the reward calculating process includes a process that provides a smaller reward when the gear ratio is changed through operation of the paddle switch than when the paddle switch is not operated.

8. The vehicle control data generating method according to claim 1, wherein
    the obtaining process includes a process that obtains an accelerator operation amount, and
    the reward calculating process includes a process that provides a smaller reward when downshifting is performed through operation of an accelerator than when downshifting is not performed.

9. The vehicle control data generating method according to claim 1, further comprising:
on a basis of the relationship-defining data that has been updated by the update process, causing the execution device to establish a correspondence of the state of the vehicle and the deviation variable with a value of the gear ratio variable that maximizes the expected return, thereby generating control map data, wherein the control map data receives the state of the vehicle and the deviation variable as inputs, and outputs the value of the gear ratio variable that maximizes the expected return.

10. A vehicle controller, comprising: a memory device and an execution device, wherein
the vehicle controller
stores, in the memory device, a deviation variable related to an amount of deviation of a road on which a vehicle is traveling from a reference road, and relationship-defining data that defines a relationship between a state of the vehicle and a gear ratio variable related to a gear ratio of a transmission mounted on the vehicle, and
with the relationship-defining data stored in the memory device, causes the execution device to execute
an operation process that operates the gear ratio of the transmission,
an obtaining process that obtains the state of the vehicle and the deviation variable based on a detection value of a sensor,
a reward calculating process that causes, on a basis of the state of the vehicle obtained by the state obtaining process, a reward, that is provided when a characteristic of the vehicle meets a predetermined standard, to be larger than a reward that is provided when the characteristic of the vehicle does not meet the predetermined standard, and
an update process that updates the relationship-defining data by inputting, to a predetermined update map, the state of the vehicle and the deviation variable obtained by the state obtaining process, and the reward corresponding to the operation of the operation process,
the update map outputs the relationship-defining data that has been updated to increase an expected return of the reward of a case in which the gear ratio is operated in accordance with the relationship-defining data, and
the operation process includes a process that operates the transmission on a basis of the relationship-defining data and in accordance with a value of the gear ratio variable that corresponds to the state of the vehicle and the deviation variable.

11. A vehicle control system, comprising: an execution device and a memory device, wherein
the vehicle control system
stores, in the memory device, a deviation variable related to an amount of deviation of a road on which a vehicle is traveling from a reference road, and relationship-defining data that defines a relationship between a state of the vehicle and a gear ratio variable related to a gear ratio of a transmission mounted on the vehicle, and
with the relationship-defining data stored in the memory device, causes the execution device to execute
an operation process that operates the gear ratio of the transmission,
an obtaining process that obtains the state of the vehicle and the deviation variable based on a detection value of a sensor,
a reward calculating process that causes, on a basis of the state of the vehicle obtained by the state obtaining process, a reward, that is provided when a characteristic of the vehicle meets a predetermined standard, to be larger than a reward that is provided when the characteristic of the vehicle does not meet the predetermined standard, and
an update process that updates the relationship-defining data by inputting, to a predetermined update map, the state of the vehicle and the deviation variable obtained by the state obtaining process, and the reward corresponding to the operation of the operation process,
the update map outputs the relationship-defining data that has been updated to increase an expected return of the reward of a case in which the gear ratio is operated in accordance with the relationship-defining data,
the operation process includes a process that operates the transmission on a basis of the relationship-defining data and in accordance with a value of the gear ratio variable that corresponds to the state of the vehicle and the deviation variable,
the execution device includes a first execution device mounted on the vehicle and a second execution device that is an out-of-vehicle device,
the first execution device executes at least the obtaining process and the operation process, and
the second execution device executes at least the update process.

12. A vehicle controller employed in a vehicle control system, wherein
the vehicle control system includes an execution device and a memory device,
the vehicle controller
stores, in the memory device, a deviation variable related to an amount of deviation of a road on which a vehicle is traveling from a reference road, and relationship-defining data that defines a relationship between a state of the vehicle and a gear ratio variable related to a gear ratio of a transmission mounted on the vehicle, and
with the relationship-defining data stored in the memory device, causes the execution device to execute
an operation process that operates the gear ratio of the transmission,
an obtaining process that obtains the state of the vehicle and the deviation variable based on a detection value of a sensor,
a reward calculating process that causes, on a basis of the state of the vehicle obtained by the state obtaining process, a reward, that is provided when a characteristic of the vehicle meets a predetermined standard, to be larger than a reward that is provided when the characteristic of the vehicle does not meet the predetermined standard, and
an update process that updates the relationship-defining data by inputting, to a predetermined update map, the state of the vehicle and the deviation variable obtained by the state obtaining process, and the reward corresponding to the operation of the operation process,
the update map outputs the relationship-defining data that has been updated to increase an expected return of the reward of a case in which the gear ratio is operated in accordance with the relationship-defining data, the operation process includes a process that operates the transmission on a basis of the relationship-defining data and in accordance with a value of the gear ratio variable that corresponds to the state of the vehicle and the deviation variable, the execution device includes a first execution device mounted on the vehicle and a second execution device that is an out-of-vehicle device, the first execution device executes at least the obtaining process and the operation process, the second execution device executes at least the update process, and the vehicle controller includes the first execution device.

13. A vehicle controller employed in a vehicle control system, wherein the vehicle control system includes an execution device and a memory device, the vehicle controller stores, in the memory device, a deviation variable related to an amount of deviation of a road on which a vehicle is traveling from a reference road, and relationship-defining data that defines a relationship between a state of the vehicle and a gear ratio variable related to a gear ratio of a transmission mounted on the vehicle, and with the relationship-defining data stored in the memory device, causes the execution device to execute an operation process that operates the gear ratio of the transmission, an obtaining process that obtains the state of the vehicle and the deviation variable based on a detection value of a sensor, a reward calculating process that causes, on a basis of the state of the vehicle obtained by the state obtaining process, a reward, that is provided when a characteristic of the vehicle meets a predetermined standard, to be larger than a reward that is provided when the characteristic of the vehicle does not meet the predetermined standard, and an update process that updates the relationship-defining data by inputting, to a predetermined update map, the state of the vehicle and the deviation variable obtained by the state obtaining process, and the reward corresponding to the operation of the operation process, the update map outputs the relationship-defining data that has been updated to increase an expected return of the reward of a case in which the gear ratio is operated in accordance with the relationship-defining data, the operation process includes a process that operates the transmission on a basis of the relationship-defining data and in accordance with a value of the gear ratio variable that corresponds to the state of the vehicle and the deviation variable, the execution device includes a first execution device mounted on the vehicle and a second execution device that is an out-of-vehicle device, the first execution device executes at least the obtaining process and the operation process, the second execution device executes at least the update process, and the vehicle controller includes the second execution device.

* * * * *